US009819498B2

(12) United States Patent
Vuyst et al.

(10) Patent No.: US 9,819,498 B2
(45) Date of Patent: Nov. 14, 2017

(54) SYSTEM AND METHOD FOR WIRELESS RE-PROGRAMMING OF MEMORY IN A COMMUNICATION SYSTEM

(75) Inventors: Chris H. Vuyst, Hudsonville, MI (US); Todd R. Witkowski, Zeeland, MI (US); Carl L. Shearer, Hudsonville, MI (US); Steven L. Geerlings, Holland, MI (US); Thomas D. Klaver, Ada, MI (US)

(73) Assignee: GENTEX CORPORATION, Zeeland, MI (US)

( * ) Notice: Subject to any disclaimer, the term of this patent is extended or adjusted under 35 U.S.C. 154(b) by 23 days.

(21) Appl. No.: 13/576,077

(22) PCT Filed: Feb. 4, 2011

(86) PCT No.: PCT/US2011/023733
§ 371 (c)(1),
(2), (4) Date: Aug. 21, 2012

(87) PCT Pub. No.: WO2011/097471
PCT Pub. Date: Aug. 11, 2011

(65) Prior Publication Data
US 2012/0313744 A1  Dec. 13, 2012

(51) Int. Cl.
*G06F 9/445* (2006.01)
*H04L 9/32* (2006.01)
(Continued)

(52) U.S. Cl.
CPC .............. *H04L 9/3271* (2013.01); *G06F 8/65* (2013.01); *G07C 9/00857* (2013.01);
(Continued)

(58) Field of Classification Search
None
See application file for complete search history.

(56) References Cited

U.S. PATENT DOCUMENTS 5,757,277 A * 5/1998 Kobayashi ..................... 340/4.3
5,903,226 A   5/1999 Suman et al.
(Continued)

FOREIGN PATENT DOCUMENTS

EP    0935226 A2   8/1999
EP    1 959 415 A2  8/2008
(Continued)

OTHER PUBLICATIONS

International Preliminary Report on Patentability dated Aug. 7, 2012, as received in corresponding International Patent Application No. PCT/US2011/023733.
(Continued)

*Primary Examiner* — Benyam Haile
(74) *Attorney, Agent, or Firm* — Foley & Lardner LLP; Bradley D. Johnson (57) ABSTRACT

The invention relates to a system and method of re-programming memory, and in particular, to wirelessly re-programming software, such as the application code, residing in memory of a trainable transceiver. The wireless re-programming of memory allows for software in the trainable transceiver to be updated or replaced from a remote location, where a direct or wired connection to the product is not otherwise available.

8 Claims, 13 Drawing Sheets

(51) Int. Cl.
*G07C 9/00* (2006.01)
*H04L 12/28* (2006.01)
*H04L 9/06* (2006.01)
*H04W 12/02* (2009.01)
*H04W 12/06* (2009.01)
*H04N 21/422* (2011.01)
*H04W 12/10* (2009.01)

(52) U.S. Cl.
CPC ........ *H04L 9/0631* (2013.01); *H04L 12/2818* (2013.01); *H04W 12/02* (2013.01); *H04W 12/06* (2013.01); *G07C 2009/00865* (2013.01); *G08C 2201/20* (2013.01); *G08C 2201/21* (2013.01); *H04L 2209/80* (2013.01); *H04N 21/42226* (2013.01); *H04W 12/10* (2013.01)

(56) References Cited

U.S. PATENT DOCUMENTS

| | | | |
|---|---|---|---|
| 6,323,566 B1* | 11/2001 | Meier ................ | G07C 9/00309 180/287 |
| 6,909,378 B1* | 6/2005 | Lambrechts .......... | G06F 3/0238 340/12.25 |
| 7,373,506 B2 | 5/2008 | Asano et al. | |
| 7,889,050 B2* | 2/2011 | Witkowski .............. | B60R 25/24 340/12.28 |
| 7,895,495 B2* | 2/2011 | Boer .................... | H04L 1/1829 714/748 |
| 8,132,105 B1* | 3/2012 | Dubil .................... | G08C 19/28 715/716 |
| 2002/0169971 A1 | 11/2002 | Asano et al. | |
| 2004/0070491 A1* | 4/2004 | Huang ................... | G08C 17/02 340/10.5 |
| 2004/0208182 A1* | 10/2004 | Boles ....................... | G06F 8/65 370/395.5 |
| 2006/0089118 A1* | 4/2006 | Whitehouse .................. | 455/352 |
| 2006/0232377 A1* | 10/2006 | Witkowski ................... | 340/5.25 |
| 2007/0152798 A1 | 7/2007 | Witkowski | |
| 2008/0048846 A1* | 2/2008 | Nagai et al. ............ | 340/426.17 |
| 2008/0068205 A1 | 3/2008 | Witkowski | |
| 2009/0085765 A1* | 4/2009 | Bruhn ................... | G08C 23/04 340/12.22 |
| 2009/0199076 A1 | 8/2009 | Boer et al. | |
| 2010/0159846 A1* | 6/2010 | Witkowski ......... | G07C 9/00857 455/70 |
| 2010/0201891 A1* | 8/2010 | Laroia ................... | G08C 17/00 348/734 |

FOREIGN PATENT DOCUMENTS

| | | |
|---|---|---|
| EP | 2 043 054 A1 | 4/2009 |
| JP | 2001-501267 A | 1/2001 |
| JP | 2002-101476 A | 4/2002 |
| JP | 2008-160180 A | 7/2008 |
| KR | 10-2008-0015825 | 2/2008 |
| WO | WO-2008/027824 A2 | 3/2008 |

OTHER PUBLICATIONS

Notice of Reasons for Rejection dated Oct. 29, 2013, as received in corresponding Japanese Patent Application No. 2012-552106, and English language translation of the same.
Office Action dated Mar. 26, 2015, in corresponding Chinese application No. 201180017670.9, 7 pages.
Andrew N Sloss et al: "Chapter 10 Firmware" In: "ARM system Developer's Guide—Designing and Optimizing System Software", Dec. 31, 2004 (Dec. 31, 2004), Elsevier, San Francisco, CA, XP055220420, ISBN: 978-1-55860-874-0, p. 98.
Anonymous: "Booting—Wikipedia, the free encyclopedia", Wikipedia, Jan. 29, 2010 (Jan. 29, 2010), XP055220414, Retrieved from the Internet: URL:https://en.wikipedia.org/w/index.php?title=Booting&oldid=340624098 [retrieved on Oct. 13, 2015].
Extended European Search Report dated Oct. 21, 2015, received in corresponding European application No. 11 74 0418.6, 8 pages.
Office Action dated Dec. 15, 2015, received in corresponding Chinese application No. 201180017670.9 and English translation, 8 pages.
Office Action dated Jul. 27, 2016, received in corresponding Korean Application No. 10-2012-7023163, and English translation, 13 pages.
Office Action dated Jun. 2, 2016, received in corresponding Chinese Application No. 201180017670.9, 7 pages.

* cited by examiner

SYSTEM AND METHOD FOR WIRELESS RE-PROGRAMMING OF MEMORY IN A COMMUNICATION SYSTEM

CROSS-REFERENCE TO RELATED APPLICATIONS

This U.S. National Stage patent application claims priority to International Patent Application Serial No. PCT/US2011/023733 filed on Feb. 4, 2011, entitled "System And Method For Wireless Re-Programming Of Memory In A Communication System," and U.S. Provisional Application No. 61/301,507, filed Feb. 4, 2010, the entire disclosures of these applications being considered part of the disclosure of this application and hereby incorporated by reference.

BACKGROUND

The invention relates to a system and method of re-programming memory, and in particular, to wirelessly re-programming software residing in memory of a trainable transceiver.

Conventional systems for controlling appliances and devices, such as garage door openers, security gates, home alarms, lighting, computers, etc., use individual remote controls to operate a respective appliance and/or device. With this conventional system, it is difficult to control multiple devices or appliances, much less consolidate operation of the appliances and devices into a single, controllable system. For example, garage door opener mechanisms open and close a garage door in response to a radio frequency control signal. The control signal is typically generated and transmitted from a remote control that is sold with the garage opener. The control signal has a preset carrier frequency and control code such that the garage door opener mechanism is responsive only to the remote control issuing the associated control signal. A problem associated with this type of system is that the door opener must receive a specific predetermined control signal in order to be operated. That is, each appliance and device must receive a specific predetermined control signal. Therefore, a user wishing to control multiple appliances and/or devices is required to have multiple remote controls.

Figure 1:
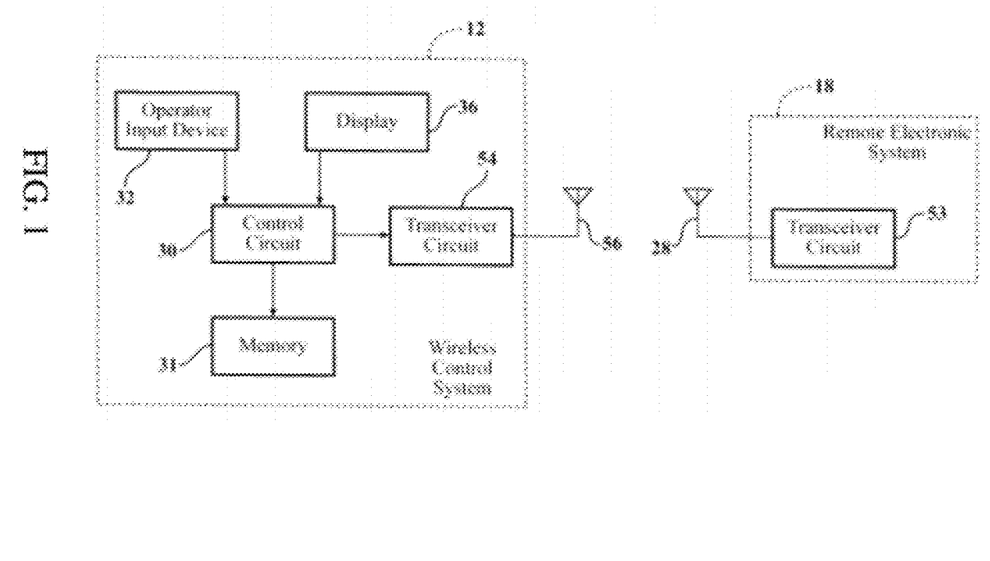
FIG. 1 illustrates an exemplary wireless control system and remote electronic system in accordance with the prior art.

With an ever evolving technological society, there is an increasing demand for a wireless communication system that is capable of operating multiple remote electronic devices (such as appliances and electronic devices remotely located from the controlling device) in a consolidated manner. A wireless communication system currently exist which enable multiple appliances and devices to communicate with a central or single remote device. One such system is Homelink™, owned by Johnson Control's, Inc., in which a trainable transceiver is able to "learn" characteristics of received control signals such that the trainable transceiver may subsequently generate and transmit a signal having the learned characteristics to a remotely controlled device or appliance. For example, one such system is disclosed in U.S. Pat. No. 5,903,226, hereby incorporated by reference. FIG. 1 illustrates an exemplary wireless control system 12 having a transceiver circuit 54 and a remote electronic system (remote device) 18 also having a transceiver circuit 53. Another such system is disclosed in EP Pat. No. 0 935 226 B1, also hereby incorporated by reference.

In order for the trainable transceivers to operate, each signal is typically associated with a user-actuated switch or a user selects one of the learned signals on the trainable transceiver by selecting an associated switch (e.g. by pressing a button on the trainable transceiver associated with the device to be operated). For the trainable transceiver to learn the signal characteristics of various signals of different length and duration, the amount of memory provided and allocated within the trainable transceiver for each transmission channel must be sufficient to store the characteristics of the largest signal to be learned.

Additionally, in order for the trainable transceiver to work properly in the communication system, it must be compatible with the remote electronic device, and in particular, with potentially numerous remote electronic devices that the trainable transceiver is likely to communicate with over the course of time. Naturally, it is difficult to predict which of these remote electronic devices a user may wish to control such that the trainable transceiver may be programmed for compatibility. Moreover, as new remote electronic devices are developed, after the trainable transceiver has been initially programmed, there is no current process to update the trainable transceiver such that the new remote electronic device is compatible for use in the wireless communication system.

SUMMARY OF THE INVENTION

The invention relates to a system and method of re-programming memory, and in particular, to wirelessly re-programming software, such as the application code, residing in memory of a trainable transceiver. The wireless re-programming of memory allows for software in the trainable transceiver to be updated or replaced from a remote location, where a direct or wired connection to the product is not otherwise available.

In one embodiment of the invention, there is a method of programming memory in a wireless control system using a remote device, including receiving application code from the remote device; and programming the application code into at least part of the memory of the wireless control system, such that the wireless control system operates at least one remote electronic device, not otherwise paired with the wireless control system, using the programmed application code.

In one aspect of the invention, the method includes entering into a programming mode on the wireless control system; authenticating communication between the wireless control system and the remote device; and indicating a status of the authentication communication.

In another aspect of the invention, the application code is encrypted with a common key and appended with header information.

In still another aspect of the invention, the method includes extracting the header information; decrypting at least a first block of data with the common key; and storing data in a program code buffer in the remote device for sending to the wireless control system.

In yet another aspect of the invention, the wireless control system further comprises: receiving the at least first block of data from the remote device; verifying the integrity of the at least first block of data; determining an end of transmission of the at least first block of data; and programming at least part of the memory of the wireless control system with the application code.

In another aspect of the invention, the remote device includes verifying that the application code is compatible the remote electronic device; and send the at least one data block to the wireless control system until an end of data is reached.

In another embodiment of the invention, there is a system for programming memory, including a wireless control system including at least a transceiver circuit and memory; and a remote device including at least a transceiver circuit and memory, wherein application code stored in the memory of the remote device is sent to the wireless control system and received by the transceiver circuit, and the application code received by the transceiver circuit is programmed into at least part of the memory of the wireless control system, such that the wireless control system operates at least one remote electronic device, not otherwise paired with the wireless control system, using the programmed application code.

BRIEF DESCRIPTION OF THE DRAWINGS

The invention is described below with reference to the exemplary drawings, in which.

DESCRIPTION OF THE EMBODIMENTS

The invention relates to a system and method of re-programming memory, and in particular, to wirelessly re-programming software, such as the application code, residing in memory of a trainable transceiver. The wireless re-programming of memory allows for software in the trainable transceiver to be updated or replaced from a remote location, where a direct or wired connection to the product is not otherwise available.

In one embodiment of the invention, software residing in memory of a trainable transceiver is re-programmed (wired or wirelessly). In the exemplary embodiment, encrypted program code is transferred wirelessly, such as via Radio Frequency (RF) link from a device (or "tool") located at a remote location from the trainable transceiver. A remote location may be any distance for which wired or wireless transmissions can be performed. The trainable transceiver, using software residing in one area of memory (referred to as the boot loader code), decrypts and processes the program code such that it is programmed into another area of memory (referred to as the application code). This programming may be a complete or partial re-programming of the application code currently residing in the memory. A more detailed description follows with reference to the drawings.

Figure 2A:
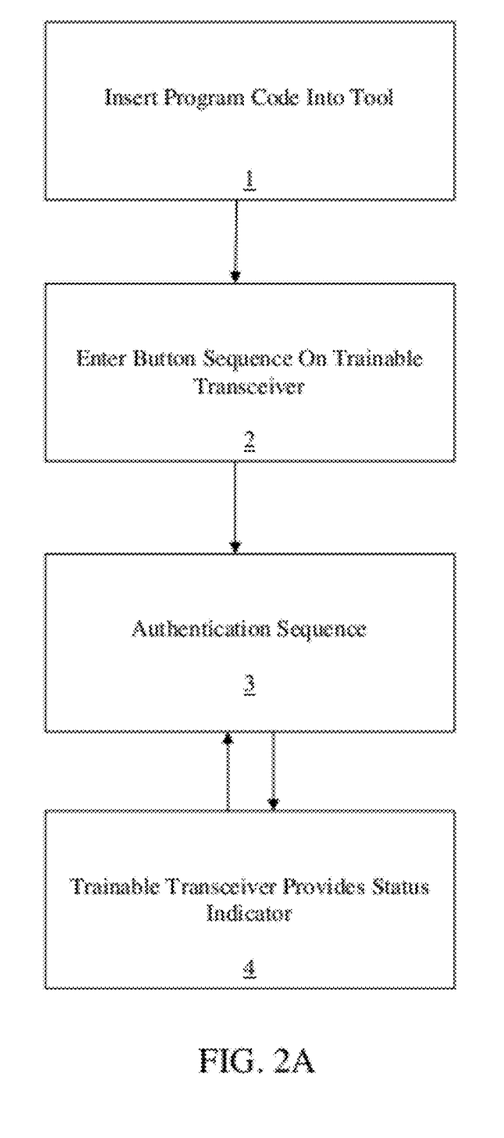
FIG. 2A illustrates an exemplary flow chart of re-programming memory in accordance with the invention.

FIG. 2A illustrates an exemplary flow chart of re-programming memory in accordance with the invention. Program code, which is preferably encrypted (as explained below with reference to FIG. 5), can be stored in memory, such as USB flash drive, a computer, a cell phone, PDA, etc. The program code is inserted or transmitted to a tool which is used to re-program the trainable transceiver, as follows.

In step (1), a device, such as a flash drive, storing encrypted program code (AppCode.enc) is inserted into the tool. See, for example, FIG. 2B which illustrates an exemplary embodiment of a flash drive USB being inserted into tool RT. The tool RT extracts data from the flash drive USB and decrypts the data into binary program data (AppCode.bin) for storage in the tool RT and later use. In step (2), a trainable transceiver 12 is placed it into programming mode, for example, by pressing a sequence of buttons B1, B2, B3 on the trainable transceiver 12, as depicted in FIG. 2C. Once the device is placed into programming mode, an authentication sequence occurs between the tool RT and the trainable transceiver 12, in step (3). Transferred during the authentication sequence is data related to re-programming of the application code, including for example the parts number (EPN), Serial Number (SN), as well as the current application version (if applicable) and boot loader version. Once authenticated (typically after various keys and counters have been calculated), the trainable transceiver 12 notifies the tool RT that the application is ready to be programmed.

The tool RT begins to transfer the encrypted application program code stored on the flash device one RF data frame at a time, until the entire application program code is transferred. It is appreciated that while RF transmission is described in the exemplary embodiment, the invention is not limited to such type of transmission, and any form of wireless transmission may be used as readily understood. Acknowledgements (ACK) from the trainable transceiver 12 are also sent back to the tool RT during each transmission of a data frame to ensure that no errors have occurred during transfer. If an error occurs during transmission of the data frame (for example, a Checksum fails), then a set number of "retries" will be processed until the transmission is deemed unsuccessful. Any errors that occur during transfer may be indicated on a display on the trainable transceiver and/or a display of the tool RT, as depicted in FIG. 2 at step (4). The display 36a may be for example LED or any other means to indicate a response. For example, while the trainable transceiver 12 is writing program memory AC, an LED on the trainable transceiver may flash on and off indicating that the process is being performed, or a screen may display that data is being written to memory. The display 36a may also indicate successful or unsuccessful completion of the transfer of data. For example, the LED may blink a number code indicating the type of error and that additional programming is necessary, or a green light may indicate successful completion.

Figure 2B:
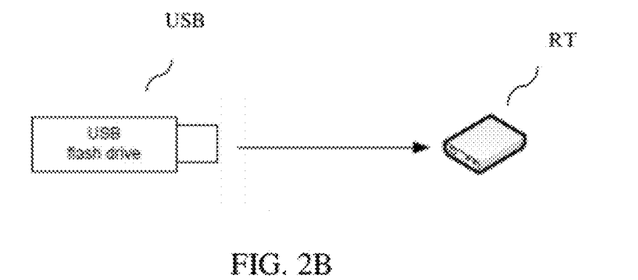
FIG. 2B illustrates an exemplary memory device and tool in accordance with the invention.
Figure 2C:
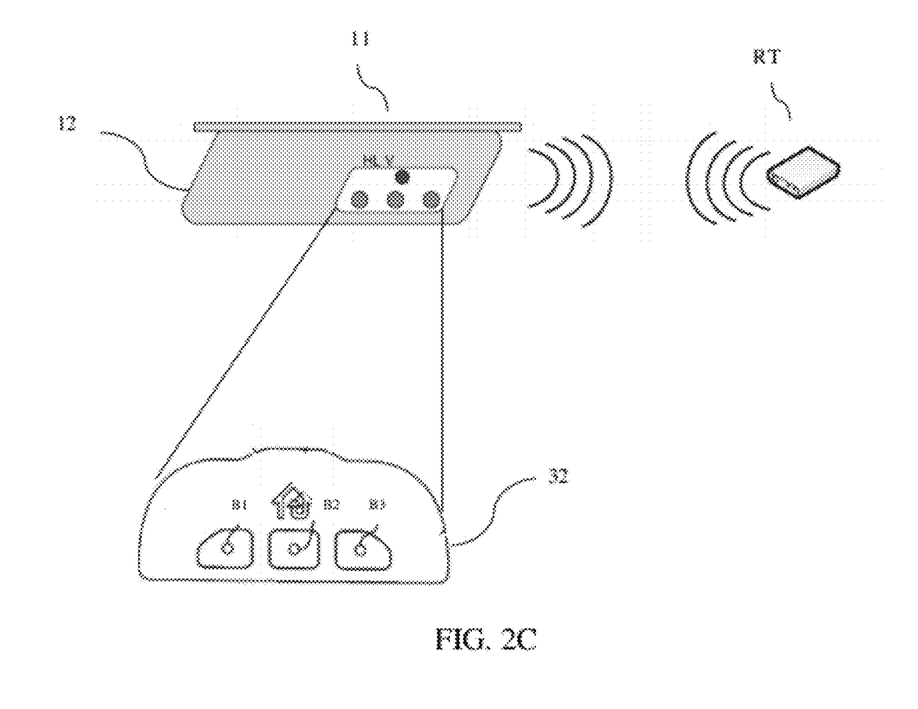
FIG. 2C illustrates an exemplary wireless control system with an enlarged view of an input device in accordance with the invention.
Figure 3:
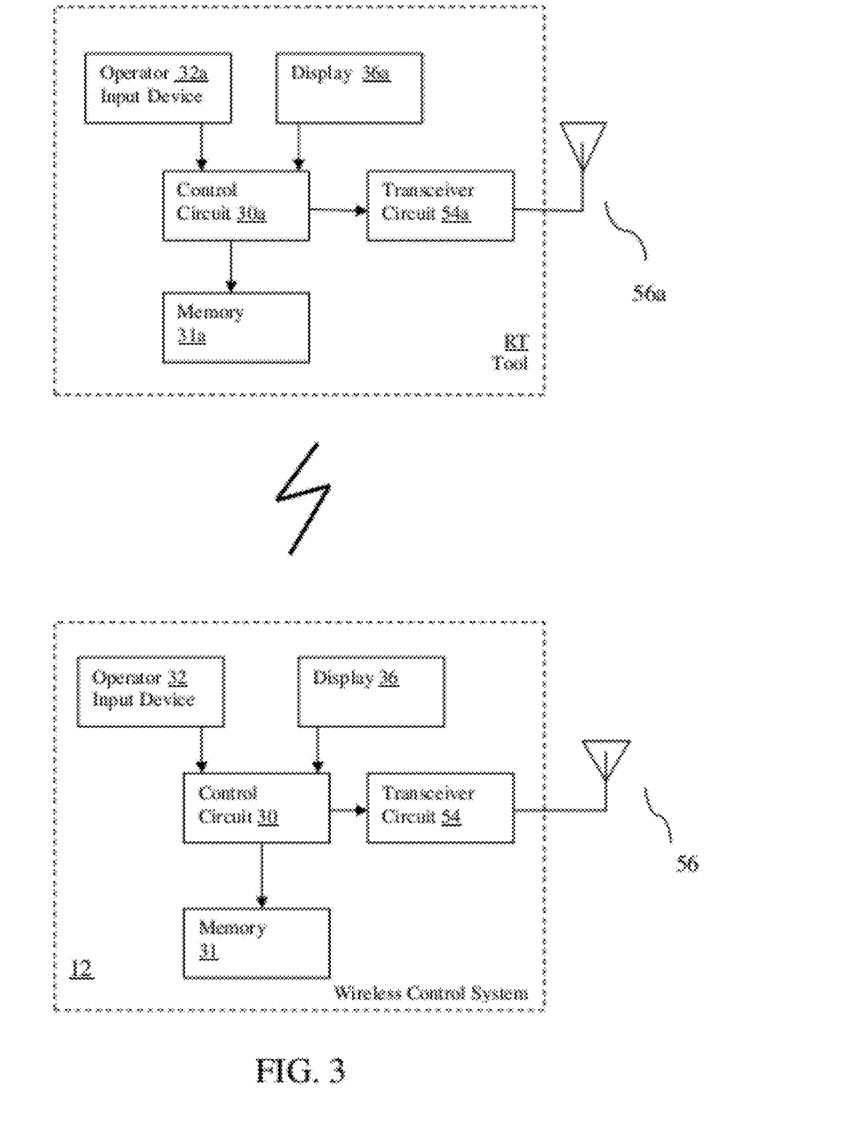
FIG. 3 illustrates an exemplary wireless control system in communication with a tool in accordance with the invention.

FIG. 3 illustrates an exemplary wireless control system in communication with a tool in accordance with FIGS. 2B and 2C. The wireless control system (also referred to as a trainable transceiver) 12 and tool RT each include in the exemplary embodiment an operator input device 32/32a, a display 36/36a, a control circuit 30/30a, memory 31/31a and a transceiver circuit 54/54a. The tool also includes an input to receive data, such as an input for a USB storage device. It is appreciated that these descriptions are exampling in nature, and that the tool and trainable transceiver (i.e. wireless control system) are not limited to the disclosed embodiments. For example, the trainable transceiver and tool need not include each of the devices illustrated in the embodiments, and may also include additional features such as an interface provided for connection to other devices.

Figure 4A:
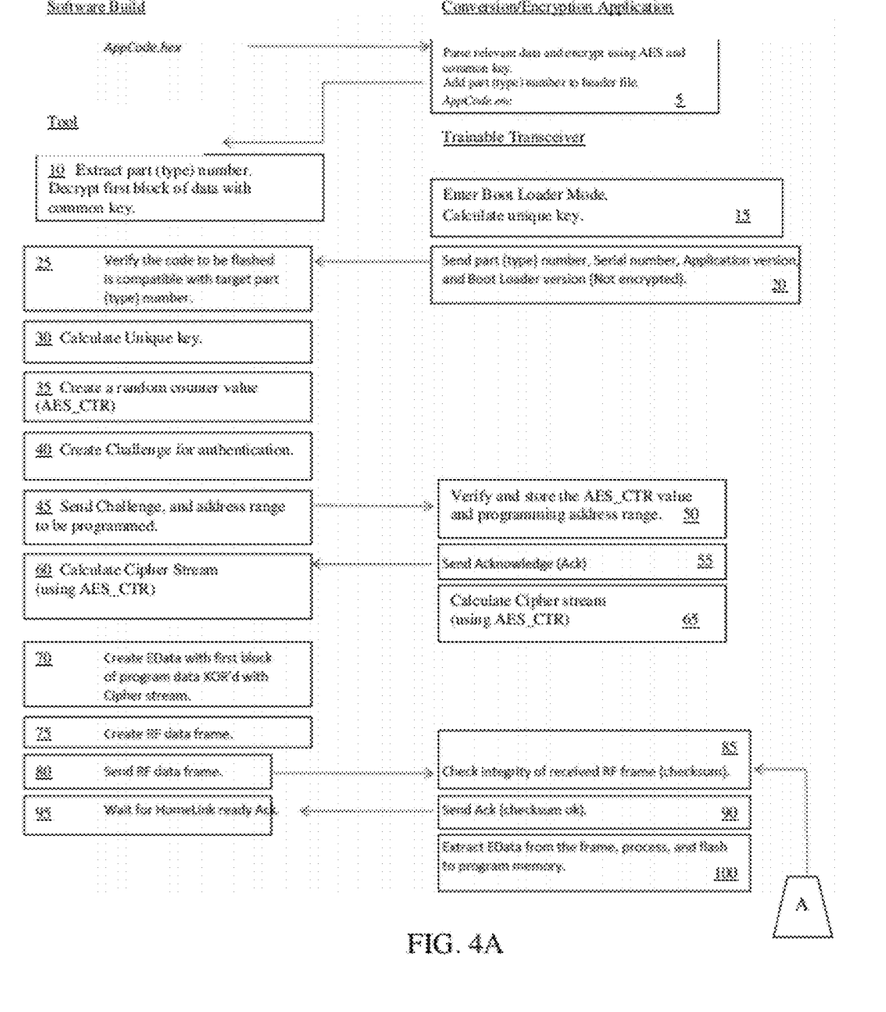
FIGS. 4A and 4B illustrate communication between a trainable transceiver and tool in accordance with the invention.
Figure 4B:
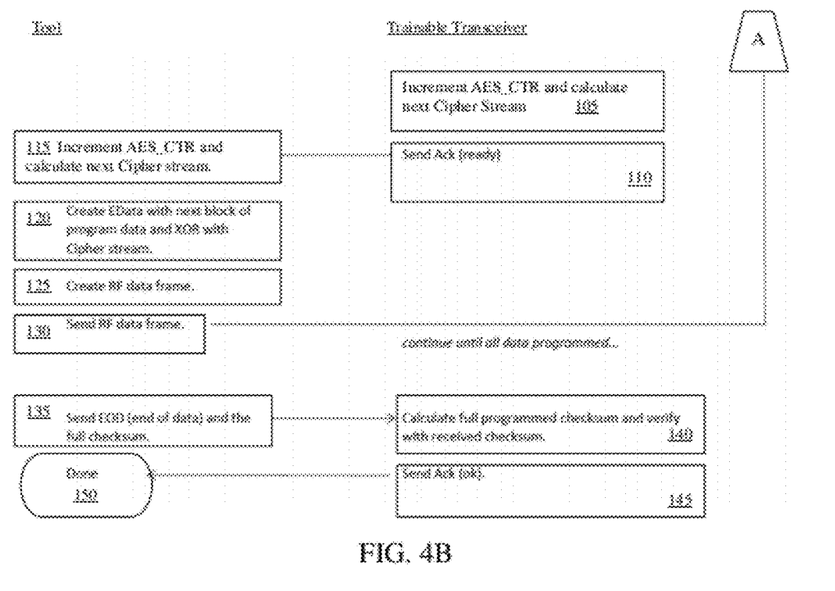
Figure 5:
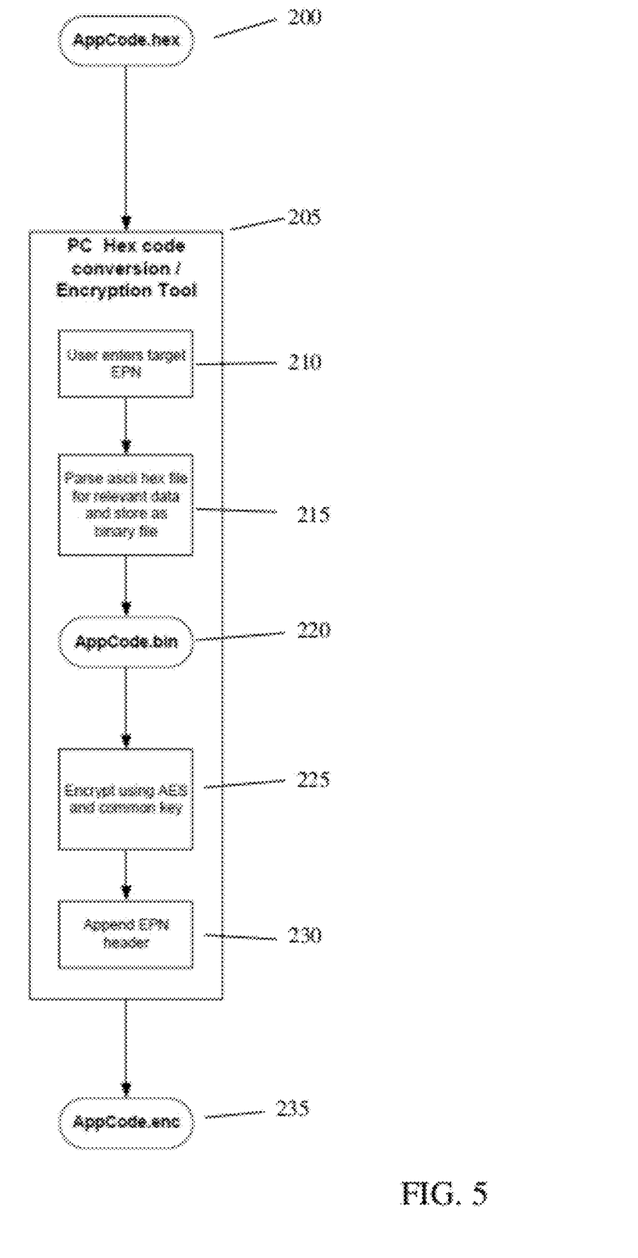
FIG. 5 illustrates an exemplary flow of code converted and encrypted in accordance with the invention.

FIGS. 4A and 4B illustrate communication between a trainable transceiver and tool in accordance with the invention. Application code resides in the Application Code Block AC memory 31 of the trainable transceiver 12 (see, FIG. 9). During programming of the trainable transceiver 12, for example to update application code in the trainable transceiver memory 31 to operate with new or incompatible remote electronic devices, data in the application code block (the application code) is updated or replaced with the application code transmitted from the tool RT. As part of constructing the transmitted application code, and in order to secure storage of the code, relevant data is parsed from the application code and encrypted (for example, with a common key), and information such as the part (type) number is added to the header of the application code file (5), as illustrated in FIG. 5 and described in more detail below. The encrypted program code (AppCode.enc), is then stored in the tool RT, or another memory device (such as a flash drive) that can be accessed by the tool RT, for later use. See, for example, FIG. 6, also described in more detail below. It is appreciated that any encryption technique may be used to encrypt the data, and the encryption is not limited to the described exemplary embodiments.

To re-program memory 31 of the trainable transceiver 12, a device RT (such as the afore-mentioned tool RT) capable of reading the application code stored on the USB flash drive is used. The tool RT may be, for example, a stand-alone unit or a computer that may properly decrypt the encrypted application code stored on the USB flash drive. It is appreciated that the tool may be any device to read and decrypt the application code, as well as transmit the application code to the trainable transceiver, as readily understood by the skilled artisan. Once the encrypted data (AppCode.enc) is received from the flash drive USB, the tool RT extracts information, such as part (type) number from the header file of the encrypted data, and decrypts the first block of data (for example, using a common key) at 10. It is appreciated that the entire file can be decrypted, as opposed to a block of data, as understood by the skilled artisan. In order for the trainable transceiver 12 to communicate with the tool RT, the trainable transceiver 12 is placed into program mode ("Boot Loader Mode") at 15, for example, by selecting a button sequence on the input device 32. Upon entry into the program mode, a unique key (for example, a key for each tool that is associated with the trainable transceiver) is generated by the trainable transmission. Information, such as the part (type) number, serial number, application version and boot loader version (not encrypted) of the trainable transceiver are then sent to the tool 20. At 25, the tool RT verifies that the application code is compatible with the part (type) number of the trainable transceiver 12 in order to synchronize with the trainable transceiver 12. If the part number is not compatible (i.e. the part number is not verified), then communication ends. Otherwise, a unique key is calculated by the tool RT at 30, a random counter value (AES_CTR) is created at 35, and a challenge is created for authentication at 40.

The challenge is sent, along with the address range, to the trainable transceiver 12 at 45, and the trainable transceiver 12 verifies and stores the AES_CTR value and the programming address range in memory 31 (at 50). An acknowledgement (ACK) is sent back to the tool RT at 55, and a cipher stream is calculated using the AES_CTR value at the tool RT and trainable transceiver 12, at 60 and 65, respectively. At this point, the tool RT and trainable transceiver 12 have confirmed compatibility and verified the transmission link.

At 70, encrypted data (EData) is created using the first block of program data XOR'ed with the cipher stream, and an RF data frame is created (at 75). The EData includes the program code and associated information required to reprogram the trainable transceiver. The EData is placed inside the RF data frame so that additional information related to the data (for example, length and checksum) can be included in the transmission, along with various commands (CMDs). The RF data frame is sent from the tool RT to the trainable transceiver 12 (at 80), where it is checked for integrity using, for example, a checksum (at 85). If the checksum is verified, a checksum acknowledgement (ACK) is sent back to the tool, at 90, while the tool RT waits for a "ready" acknowledgment from the trainable transceiver 12 processing the data (at 95).

The trainable transceiver 12 extracts the EData from the RF data frame, processes the data such that it is decrypted using the cipher stream, and uses for example the additional information embedded into the EData, such as address and length. The new/updated program code is then written into memory in the application code block AC, at 100. The random number AES_CTR is then incremented on the tool RT and trainable transceiver 12, and another cipher stream is calculated at 105-115. At this point, the process loops back to create another EData with the next block of program data and XOR'ed with the cipher stream (at 120), an RF data frame is created (at 125) and the RF data frame is sent to the trainable transceiver 12 (at 130). This process continues until the last data block is received by the trainable transceiver 12, at which time an End of Data (EOD) command is sent to the trainable transceiver 12 by the tool RT (at 135), along with a full checksum. When the EOD command is received at the trainable transceiver 12, a full programmed checksum is calculated and verified with the received checksum (at 140), and an ACK is sent to the tool RT (at 145), which completes the transfer of data process (at 150). The application code is now stored.

FIG. 5 illustrates an exemplary flow of code converted and encrypted in accordance with the invention. The program code (AppCode.hex) 200 is initially programmed as hexadecimal code, although is not limited to such an embodiment. It is appreciated that any form of code may be used. When the AppCode.hex is received by the conversion/encryption tool 205 (which may be any device capable of converting and encrypting data, such as a computer or tool RT), a part number of the targeted trainable transceiver 12 is entered at 210. The AppCode.hex file is parsed for relevant data and stored as a binary file (AppCode.bin) at 215 in the tool RT. The AppCode.bin file 220 is encrypted using AES and an common key 225 and the part number is appended to the header of the file and stored at 230 (for example on flash drive USB) as an encrypted application code (AppCode.enc) 235.

Figure 6:
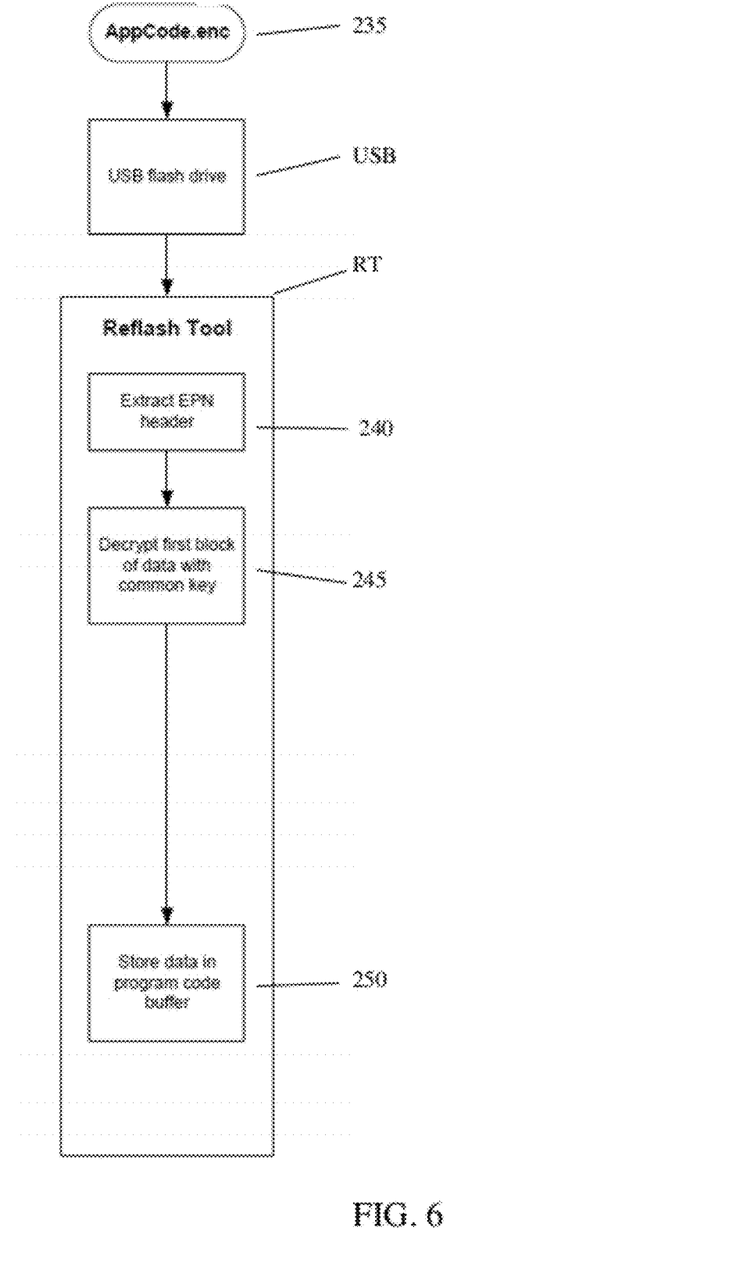
FIG. 6 illustrates the encrypted code inserted into the tool for programming memory in accordance with the invention.

FIG. 6 illustrates the encrypted code inserted into the tool for programming memory in accordance with the invention. The stored AppCode.enc file 235 is transmitted to the tool RT (or, if created by tool RT is already resident in memory). Here, the part number in the header is extracted at 240, and the first block of data is decrypted using the common key at 245. Data is then stored in memory for later transmission to the trainable transceiver 12 at 250.

Figure 7A:
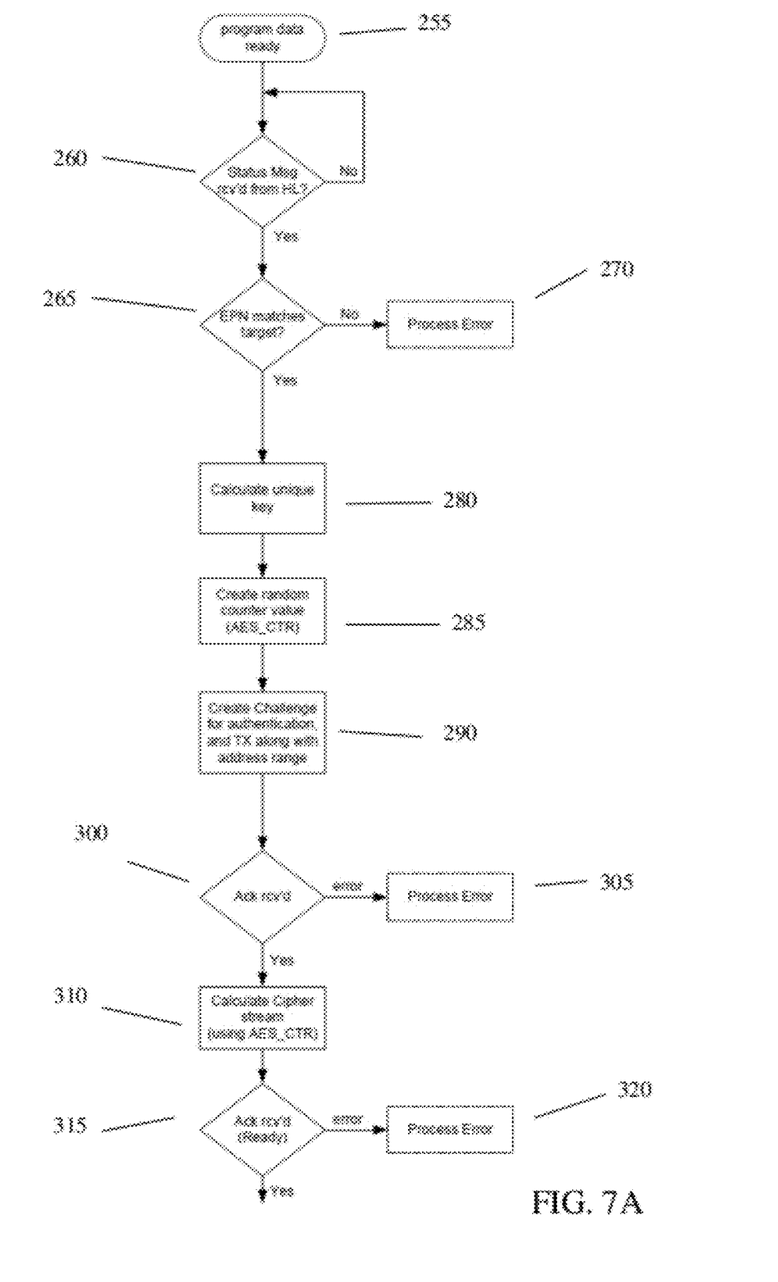
FIGS. 7A and 7B illustrate an exemplary flow diagram of receipt and transmission of data as viewed from the tool.
Figure 7B:
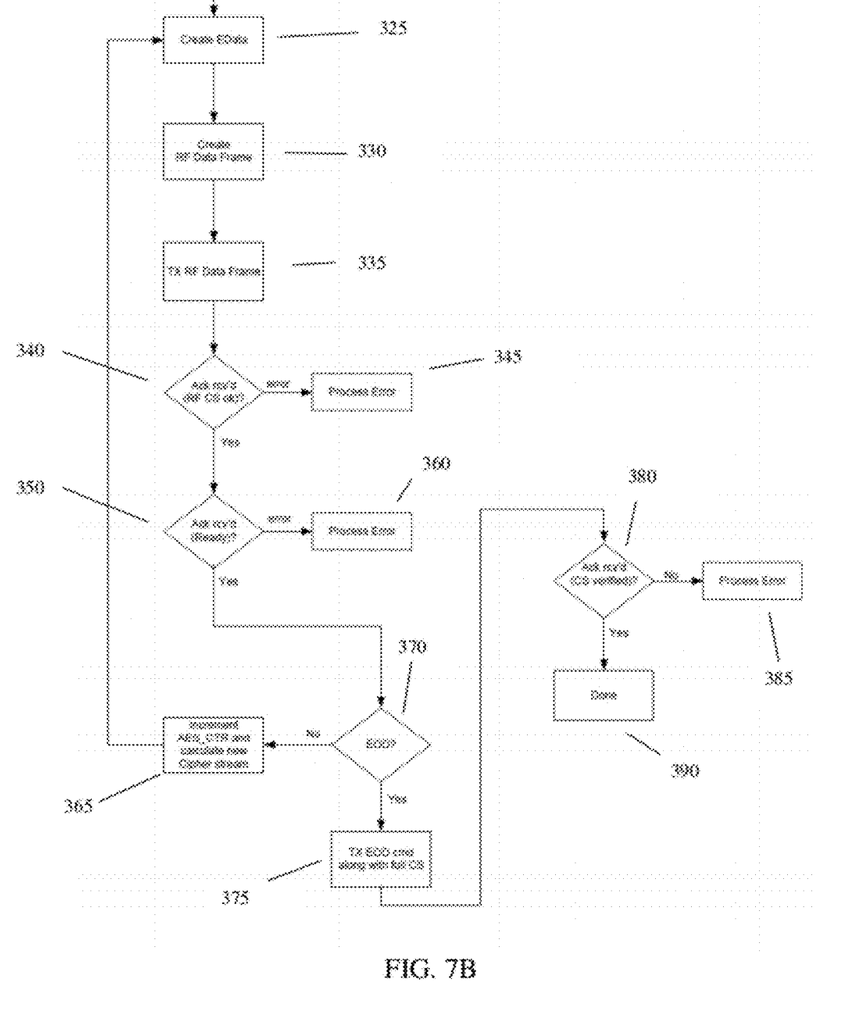

FIGS. 7A and 7B illustrate an exemplary flow diagram of receipt and transmission of data as viewed from the tool as described in FIGS. 4A and 4B. Once program code is ready (255) for transmission from the tool RT to the trainable transceiver 12, the tool RT determines whether a status message is received from the trainable transceiver 12 at 260. If not, then the tool RT waits for a status message. If a status message has been received, then the tool RT determines if the part number included in the transmitted message matches at 265. If not, then a process error occurs at 270. If the target matches, a unique key is calculated at 280, a random counter AES-CTR is created at 285, and a challenge is created for authentication and transmitted along with an address range at 290. Once an acknowledgement (ACK) is received from the trainable transceiver 12 at 300, a cipher stream is calculated using the AES_CTR at 310. If an ACK is not received, then a processing error occurs at 305. Once the ACK is received and ready, EData is created at 325, an RF data frame is created at 330, and the RF data frame is transmitted at 335. A process error occurs at 320 if no "ready" ACK is received. Otherwise, tool RT waits for an ACK that a checksum of the RF data frame is received and determines whether it is "ready" (350) or not (360). Otherwise, a processing error occurs at 360. If "ready," then it is determined at 370 whether an End of Data (EOD) has occurred. If no, then the AES_CTR is incremented and a new cipher stream is calculated at 365. The process returns to create EData at 325. Otherwise, an EOD command is transmitted to the trainable transceiver 12 along with a full checksum (CS), which the ACK is verified at 380. If verified, then the process is complete at 390, otherwise an error has occurred at 385.

Figure 8A:
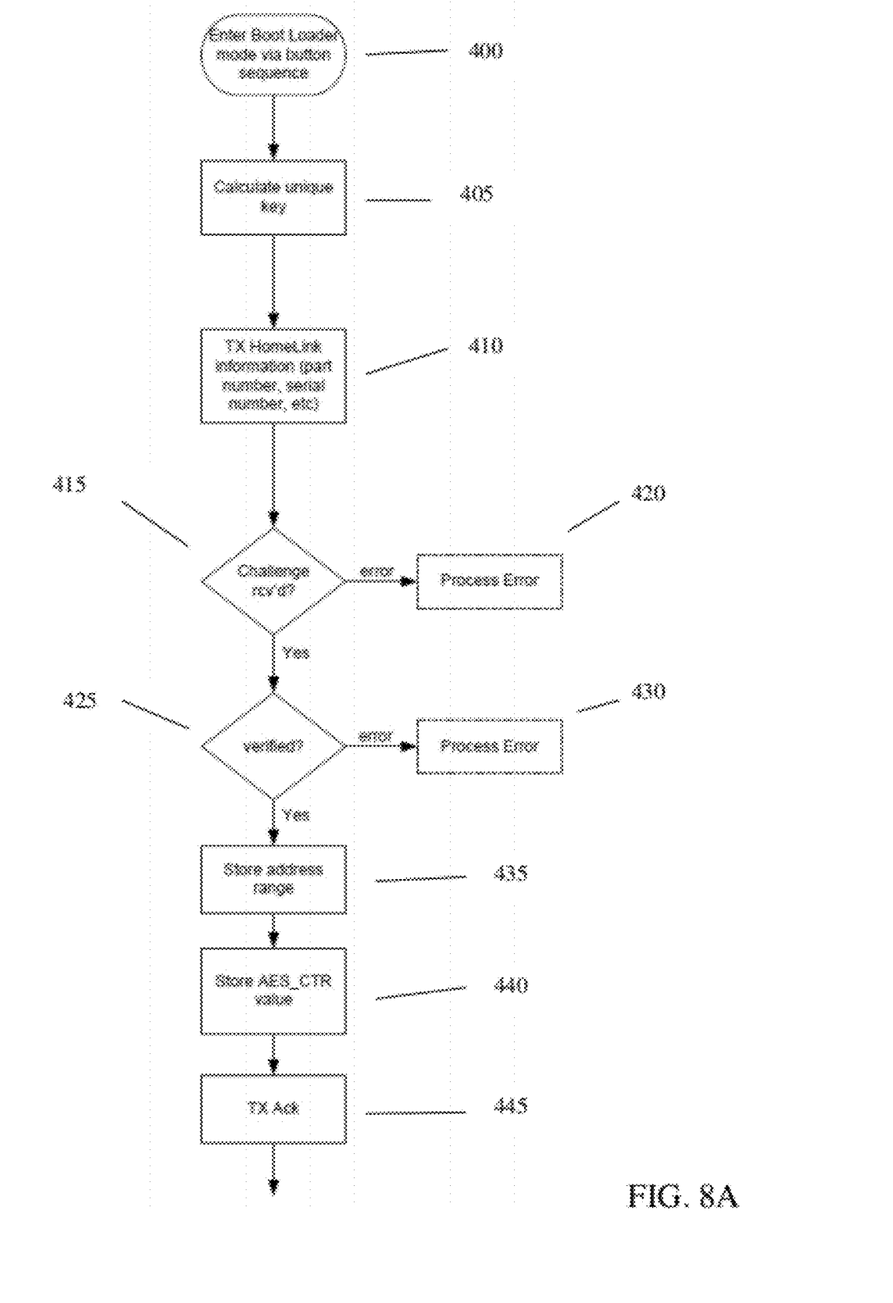
FIGS. 8A and 8B illustrate an exemplary flow diagram of receipt and transmission of data as viewed from the trainable transceiver.
Figure 8B:
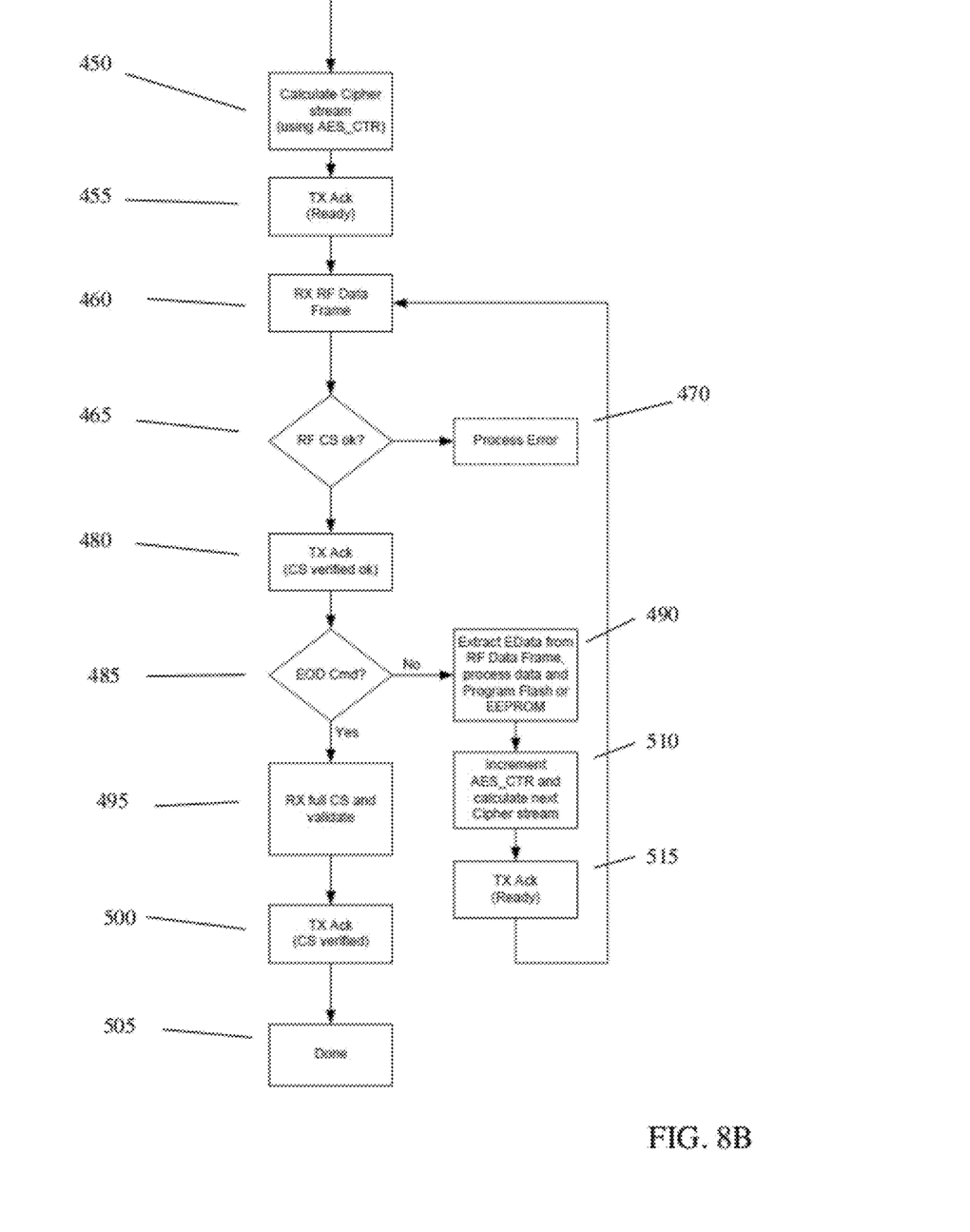

FIGS. 8A and 8B illustrate an exemplary flow diagram of receipt and transmission of data as viewed from the trainable transceiver in accordance with FIGS. 4A and 4B. The boot loader mode is entered at 400, for example by selection of a button sequence on the operator input device 32. A unique key is calculated at 405, and the trainable transceiver 12 transmits information (e.g. part number, serial number, etc.) at 410. The trainable transceiver then determines whether a challenge was received by the tool RT at 415. If not, then a process error occurs at 420. If yes, then the challenge is verified at 425. If not verified, a process error occurs at 430. If verified, on the other hand, the address range is stored at 435, along with AES_CTR value at 440, and an ACK is transmitted at 445 to the tool RT. A cipher stream is then calculated using AES_CTR at 450, and an ACK is transmitted to the tool RT at 455. In return, an RF data frame is received from the tool RT at 460, and the data frame is checked using a checksum (CS). If the CS is not valid, there is a process error at 470. If the CS is valid, then an ACK transmission is sent to the tool RT acknowledging verification of the CS at 480. It is determined whether an EOD command was also received, indicating an end of transmission of the data frames at 485. If yes, the full CS is received and validated at 495, an ACK indicating verification of the CS is transmitted at 500, and the process ends at 505. Otherwise, if an EOD command was not received, the EData is extracted from the RF data frame, data is processed and the memory is programmed at 490. The AES_CTR is incremented, and the next cipher stream is calculated at 510, followed by a transmission ACK that the trainable transceiver 12 is "ready." The process returns to receive additional RF data frames at 460.

Figure 9:
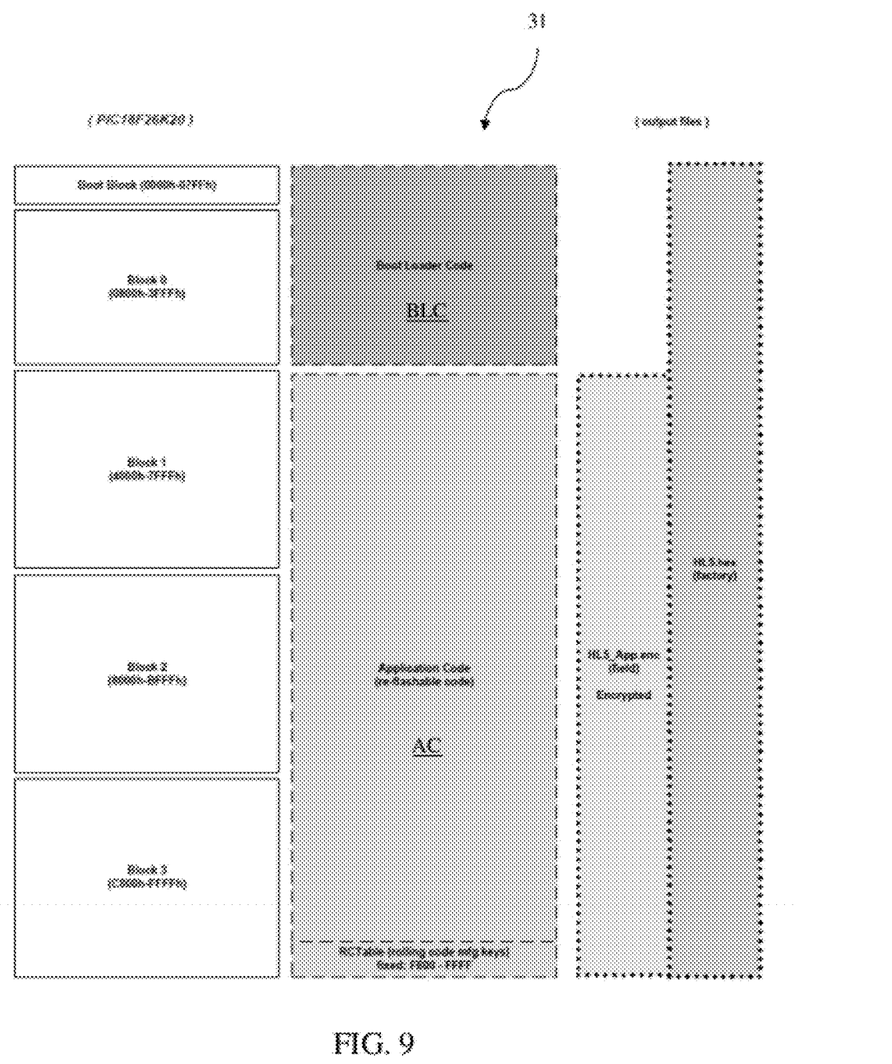
FIG. 9 illustrates an exemplary schematic diagram of memory in the wireless communication system.

FIG. 9 illustrates an exemplary schematic diagram of memory in the wireless communication system. The trainable transceiver has memory 31, which includes, but is not limited to, boot loader code BLC and application code AC. The boot loader code BLC includes code that controls the re-programming of application code AC when received from the tool RT, and the application code AC is code that allows the trainable transceiver 12 to communicate with remote electronic devices 18. The application code AC is updated (partial re-program) or entirely updated (complete re-program) to allow the trainable transceiver to operate with new remote electronic devices that are added to the system, and previously not able to communication with the trainable transceiver, as well as operate with remote electronic devices that may have been updated themselves.

While the exemplary embodiments are illustrated in the FIGS. and described herein, it should be understood that these embodiments are offered by way of example only. For example, alternative embodiments may be suitable for use in the commercial market, wherein office lights, security systems, computers, televisions, parking garage doors, or any other appliance or device are controlled. Accordingly, the described features are not limited to a particular embodiment, but extend to various modifications that nevertheless fall within the scope of the appended claims.

Those skilled in the art can now appreciate from the foregoing description that the broad teachings herein can be implemented in a variety of forms. Therefore, while the described features have been described in connection with particular examples thereof, the true scope of the features should not be so limited since other modifications will become apparent to the skilled practitioner upon a study of the drawings and the present specification.

What is claimed is:

1. A method of programming memory in a wireless control system using a remote device, comprising:
providing new application code to the remote device, the new application code configured to enable the wireless control system to train to and control a first one or more remote receiver devices;
independent of receiving a communication from one of the first one or more remote receiver devices, receiving the new application code from the remote device using wireless communication between the wireless control system and the remote device;
updating, by a boot loader of the wireless control system, an existing application code stored in the memory of the wireless control system with the new application code by controlling reprogramming of the existing application code in the memory of the wireless control system, the existing application code configured to enable the wireless control system to train to and control a second one or more remote receiver devices, wherein the first one or more remote receiver devices includes at least one remote receiver device not included in the second one or more remote receiver devices, such that updating the existing application code with the new application code newly enables the wireless control system to train to and control the at least one remote receiver device not included in the second one or more remote receiver devices;
entering into a programming mode on the wireless control system;
authenticating the communication between the wireless control system and the remote device, wherein the authentication of the communication includes:
transmitting information including at least one of a part number, a serial number, an application version, or a boot loader version of the wireless control system from the wireless control system to the remote device;
verifying, at the remote device, that the new application code is compatible with the information;

in response to the application code being compatible with the information, sending a challenge from the remote device to the wireless control system and sending an acknowledgement of the challenge from the wireless control system to the remote device; and in response to the application code not being compatible with the information, ending communication between the remote device and the wireless control system; and indicating a status of the authentication of the communication.

2. The method of programming memory of claim 1, wherein the application code is encrypted with a common key and appended with header information.

3. The method of programming memory of claim 2, further comprising:
extracting the header information;
decrypting at least a first block of data with the common key;
storing data in a program code buffer in the remote device for sending to the wireless control system; and
sending the at least one data block from the remote device to the wireless control system until an end of data is reached.

4. The method of programming memory of claim 3, further comprising:
receiving the at least first block of data from the remote device;
verifying the integrity of the at least first block of data;
determining an end of transmission of the at least first block of data; and programming at least part of the memory of the wireless control system with the application code.

5. A system for programming memory, comprising:
a wireless control system including at least a transceiver circuit, a boot loader, and memory, the memory storing an existing application code configured to enable the wireless control system to train to and control a first one or more remote receiver devices; and
a remote device including at least a second transceiver circuit and second memory and configured to be provided a new application code configured to enable the wireless control system to train to and control a second one or more remote receiver devices, wherein the second one or more remote receiver devices includes at least one remote receiver device not included in the first one or more remote receiver devices,
wherein the remote device is configured to wirelessly transmit the new application code stored in the second memory of the remote device to the wireless control system,
wherein the wireless control system is configured to receive the new application code using the transceiver circuit independent of receiving a communication from one of the first one or more remote receiver devices,
wherein the boot loader of the wireless control system is configured to update the existing application code with the new application code by controlling reprogramming of the existing application code in the memory of the wireless control system, such that the updating newly enables the wireless control system to train to and control the at least one remote receiver device not included in the first one or more remote receiver devices,
wherein the wireless control system is configured to:
enter into a programming mode in response to an input and
transmit information including at least one of a part number, a serial number, an application version, or a boot loader version of the wireless control system to the remote device; and
wherein the remote device is configured to:
verify that the new application code is compatible with the information, and
in response to the application code being compatible with the information, send a challenge to the wireless control system and receive an acknowledgement of the challenge from the wireless control system; and
in response to the application code not being compatible with the information, end communication between the remote device and the wireless control system; and
wherein the wireless control system is further configured to indicate a status of the authenticating the communication.

6. The system for programming memory of claim 5, wherein the application code is encrypted with a common key and appended with header information.

7. The system for programming memory of claim 6, wherein the remote device is configured to:
extract the header information;
decrypt at least a first block of data with the common key;
store data in a program code buffer in the remote device for sending to the wireless control system; and
send the at least one data block to the wireless control system until an end of data is reached.

8. The system for programming memory of claim 7, wherein the wireless control system is configured to:
receive the at least first block of data from the remote device;
verify the integrity of the at least first block of data;
determine an end of transmission of the at least first block of data; and
program at least part of the memory of the wireless control system with the application code.

* * * * *